July 31, 1956 G. L. PEARSON 2,757,324

FABRICATION OF SILICON TRANSLATING DEVICES

Filed Feb. 7, 1952

2 Sheets-Sheet 1

INVENTOR
G. L. PEARSON
BY [signature]
ATTORNEY

July 31, 1956 G. L. PEARSON 2,757,324

FABRICATION OF SILICON TRANSLATING DEVICES

Filed Feb. 7, 1952

2 Sheets-Sheet 2

INVENTOR
G. L. PEARSON
BY [signature]
ATTORNEY

United States Patent Office 2,757,324

Patented July 31, 1956

2,757,324

FABRICATION OF SILICON TRANSLATING DEVICES

Gerald L. Pearson, Millington, N. J., assignor to Bell Telephone Laboratories, Incorporated, New York, N. Y., a corporation of New York Application February 7, 1952, Serial No. 270,370

6 Claims. (Cl. 317—240)

This invention relates to silicon signal translating devices and to methods of fabricating such devices.

Translators of the type to which this invention pertains comprise, in general, a body of high purity silicon and a pair of connections to the body, one of the connections being ohmic or substantially so and the other forming a rectifying junction with the body. Of prime import from the standpoint of performance are the rectification ratio and the reverse current for the devices. Also of import in a number of fields of application is the Zener voltage, a factor discussed in some detail in the application Serial No. 211,212, filed February 16, 1951, of W. Shockley, now Patent No. 2,714,702.

One general object of this invention is to facilitate the fabrication and improve the performance characteristics of silicon translating devices.

More specifically, objects of this invention are to increase the rectification ratio of asymmetric silicon translating devices, to minimize the reverse currents in such devices, to enable attainment of devices having Zener voltages of any prescribed magnitude within a wide range of values, and to expedite the fabrication of rectifying junctions in silicon, of prescribed and reproducible performance characteristics.

In accordance with one feature of this invention, a rectifying junction in silicon is produced by alloying an aluminum element with the silicon, the alloying being effected by flash heating the aluminum and silicon above the eutectic temperature for the two.

In accordance with another feature of this invention, in the fabrication of a silicon translating device, substantially ohmic and rectifying connections to the silicon body are produced by the concurrent alloying of two elements with the body. One element may be aluminum and the other of gold or a gold-antimony alloy, the former producing the rectifying junction and the latter a substantially ohmic connection.

In one illustrative embodiment of this invention, a strip of gold is mounted upon a high resistance heater, for example a ribbon of tantalum, and a slab of high purity N conductivity type silicon is seated upon the gold strip. An aluminum wire, for example of the order of 3 mils in diameter, is mounted with one end in contact with the face of the slab opposite that contiguous with the gold. Then, with an inert atmosphere maintained about the assembly, the heater is energized by passing a timed pulse of current therethrough, to heat the assembly to about 650° C., approximately the melting point of aluminum and above the eutectic temperature, 570° C., for aluminum and silicon. This temperature also is above the eutectic temperature, about 370° C., for gold and silicon. As a result of the flash heating, both the aluminum and gold alloy with the portions of the silicon body contiguous therewith.

In another illustrative embodiment of the invention a gold-antimony alloy is used in place of gold in making the ohmic connection to the N-type silicon slab.

The rectifying junction thus produced between the aluminum wire and the silicon body exhibits a very high rectification ratio, for example of substantially $10^8$ at one volt, and an exceedingly small reverse current, for example of substantially $10^{-10}$ amperes in typical devices. Further, this junction has a sharp Zener voltage characteristic and the Zener voltage is readily controllable. Specifically, it has been found that the Zener voltage varies substantially linearly with the resistivity of the silicon, being about 10 volts for the case of silicon of 0.5 ohm centimeter resistivity and about 1,000 volts for silicon of 50 ohm centimeter resistivity. The forward current characteristic is not affected substantially at low voltages by the resistivity of the silicon material. Also, it has been found, the rectifying junction is very temperature stable.

The invention and the above noted and other features thereof will be understood more clearly and fully from the following detailed description with reference to the accompanying drawing in which.

Figure 1:
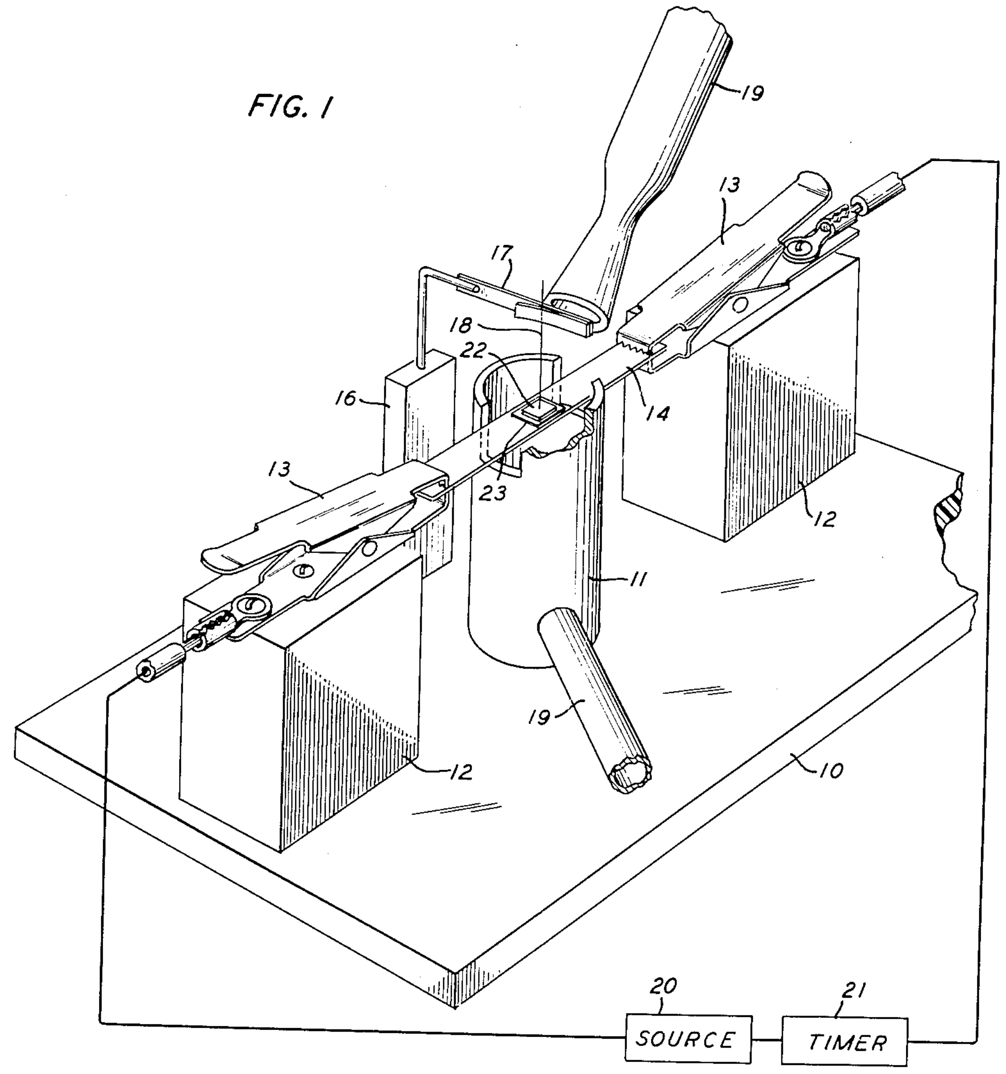
Fig. 1 is in part a perspective view and in part a circuit diagram illustrating apparatus which may be used in fabricating signal translating devices in accordance with this invention.

Referring now to the drawing, there is illustrated in Fig. 1 apparatus suitable for the fabrication of silicon translating devices in accordance with this inventon. It comprises a base plate or support 10 having mounted thereon a hollow cylindrical member 11 and a pair of insulating supports 12. The supports carry conductive clips 13 which mount a refractory metal filament 14 for example of tantalum. Also carried by the support 10 is an insulating block 16 carrying a resilient clasp 17. The clasp is adapted to mount a wire 18 to be joined to the silicon body as described hereinafter. Appropriate jets 19 are provided to direct an inert gas, for example helium, through the cylindrical member 11 and adjacent the filament 14 during fabrication of the translating device.

It will be understood that suitable adjusting members not shown may be provided for locating the supports 12 and clasp 17 relative to each other and to the silicon body to be operated upon.

The filament 14 is arranged to be heated to a desired temperature from a source 20 over a circuit under control of a timer element 21.

Figure 2:
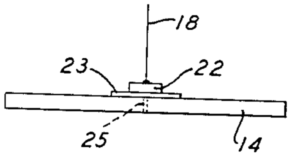
Figs. 2, 3 and 4 are elevational views of several devices constructed in accordance with this invention.

In one manner of making the translating device illustrated in Fig. 2, a silicon wafer 22 is seated upon a thin strip of gold 23, which in turn is seated upon the tantalum filament 14. Advantageously, prior to their mounting, the silicon and the aluminum wire are etched to clean them. The aluminum wire 18 is adjusted to bear against the upper face, in Fig. 2, of the silicon wafer 22. Then the filament 14 is energized thereby to heat the silicon body 22 to a temperature of about 650° C. As a result, the end of the aluminum wire in engagement with the wafer 22 alloys with the silicon and also the gold alloys with the opposite face of the wafer. Prior to and during the heating of the filament a suitable inert gas such as helium is directed through the jets 19 against the pile-up of the gold, silicon and aluminum.

In a typical and illustrative case, the wafer 22 was of N-type silicon having a resistivity of 0.5 ohm centimeter, of .100″ diameter and .020″ thick. The wire 18 was of aluminum and about 3 mils in diameter, the gold sheet 23 was .001″ thick. Alloyage of the aluminum and gold with the silicon was effected by passing a current of about 50 amperes for 3 seconds through a tantalum filament of 0.10 ohm resistance.

Following the alloying, advantageously the silicon and connector assembly is etched, for example for about 60 seconds in a solution composed of 25 cubic centimeters nitric acid, 15 cubic centimeters, 48 per cent hydrofluoric acid and 15 cubic centimeters glacial acetic acid. Also, following the etching, the unit may be heated to drive off moisture and then dipped in wax, for example ceresin, to provide a protective coating thereon.

Figure 5:
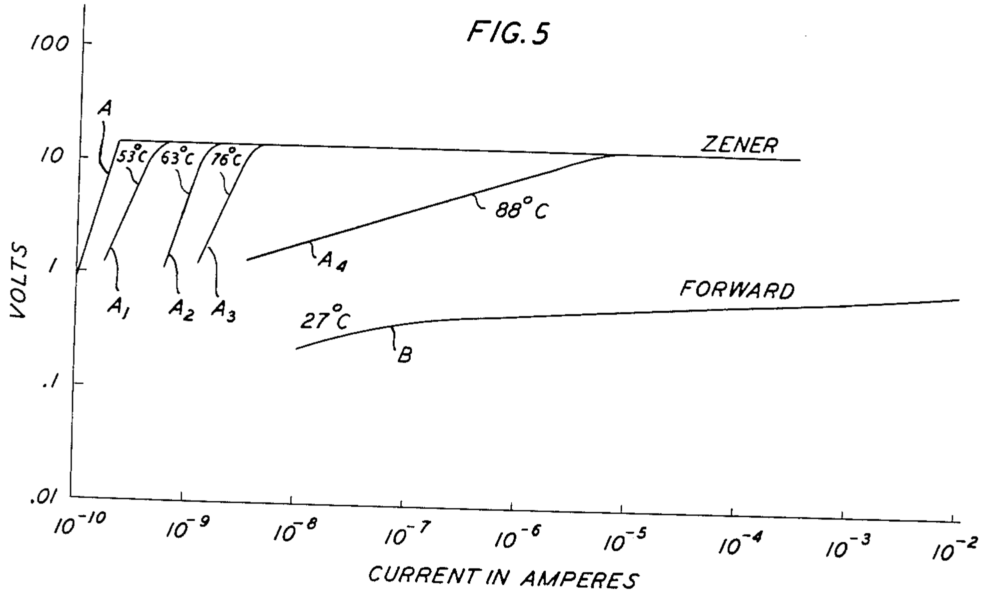
Figs. 5 and 6 are graphs depicting performance characteristics of typical rectifiers constructed in accordance with this invention.
Figure 6:
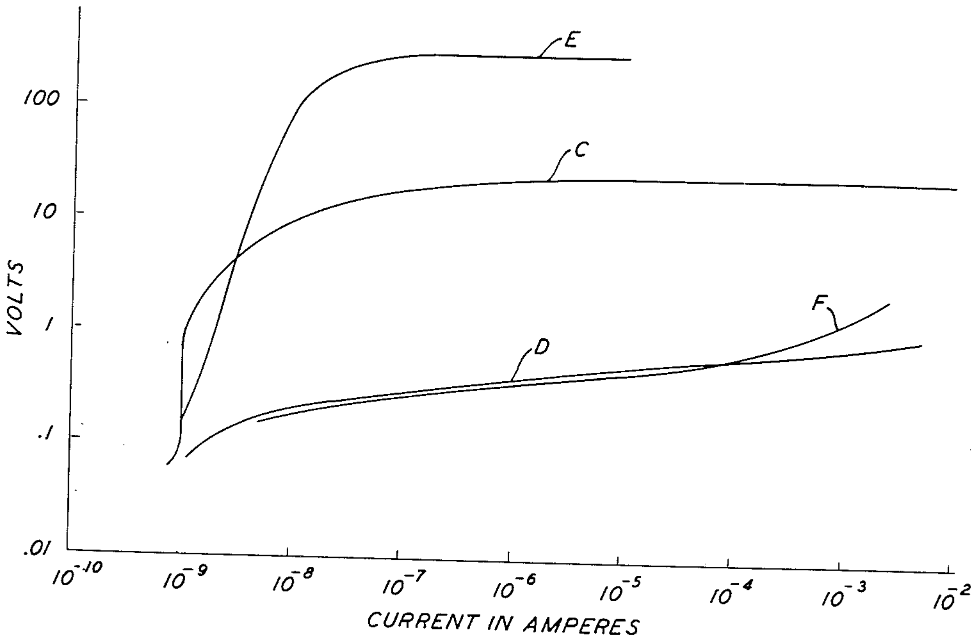

Performance characteristics of typical devices constructed as above described and including an aluminum wire and a gold element alloyed with the silicon are portrayed in Figs. 5 and 6. In Fig. 5 curves A and B show the forward and reverse characteristics respectively for the case of a silicon body of an 0.5 ohm centimeter resistivity and a 3 mil aluminum wire 18, the characteristics being for an ambient temperature of 27° C. as indicated thereon. Also illustrated in Fig. 5 by curves $A_1$, $A_2$, $A_3$ and $A_4$ are the reverse characteristics for this device at other temperatures indicated on the respective curves. Particularly to be noted in Fig. 5 are the high rectification ratios, for example $10^8$ at one volt, the abrupt onset of the Zener current range and the consistency of the Zener voltage over a wide range of currents. It may be remarked also that the forward current for the conditions depicted by the curves $A_1$ to $A_4$ inclusive did not differ substantially from that portrayed by curve B so that, as is evident, the device was extremely temperature stable.

In Fig. 6, curves C and D show the reverse and forward currents respectively for a device wherein the silicon body was of 1 ohm centimeter resistivity and curves E and F depict the reverse and forward characteristics respectively of a resistivity of 20 ohm centimeter. In both cases, the aluminum wire was 8 mils in diameter. In these cases, as for the device having the characteristics illustrated in Fig. 5, the extremely large rectification ratios and small reverse currents are evident.

It will be noted also, and this is illustrated in Figs. 5 and 6, that the Zener voltage varies substantially linearly with the resistivity of the silicon. In typical structures, values of Zener between 10 and 1,000 volts have been obtained for resistivities between 0.5 and 50 ohm centimeter.

Figure 3:
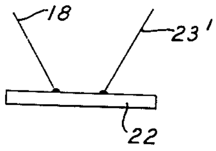

The invention may be utilized also in the fabrication of devices such as illustrated in Fig. 3 having two wires alloyed with the semiconductive body. For example, in one case such as illustrated in Fig. 3, the wire 18 may be of aluminum and the wire 23′ of gold, both these being alloyed concurrently with the silicon wafer 22 by heating the latter to about 650° C. in the manner described hereinabove.

Figure 4:
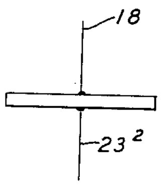

Also the invention may be utilized in the production of devices having wire connections to opposite faces of the semiconductor. For example, as illustrated in Fig. 4, an aluminum wire 18 may be alloyed with one face of a silicon wafer 22 and a gold wire $23^2$ alloyed with the opposite face of the wafer. Such structure may be fabricated in two steps with the wire 18 first affixed to the body 22 by heating the combination at about 650° C. and then subsequently inverting the unit with the wire 18 extending through an aperture 25 in the filament 14 and heating the assembly to about 370° C. to alloy the gold wire $23^2$ with the silicon.

Although the invention has been described with particular reference to the alloyage of elemental metallic members or wires with the silicon body, it may be practiced also with combinations of metals. Thus, when alloyed in the manner heretofore described gold may alter the conductivity of the silicon adjacent thereto, tending to effect a conversion of the silicon toward P-type. Such action may be compensated for by alloying a donor element with the gold member prior to the joining of this member and the silicon body. To diffuse antimony directly into silicon would entail use of relatively high temperatures and expenditure of substantial time. However, when antimony is alloyed with gold, it enters into silicon readily at about the eutectic temperature of gold and silicon. Thus, by the use of a member composed of gold and antimony, the junction between the member and the silicon body may be tailored as to conductivity and conductivity type. Other elements than antimony, which like the latter do not form a eutectic with silicon, may be employed in like manner. For example, donors such as arsenic and phosphorus may be applied as coatings to a gold wire and the coated wire and silicon heated to about the eutectic temperature of gold and silicon.

It will be understood that the embodiments of this invention shown and described are but illustrative and that various modifications may be made therein without departing from the scope and spirit of this invention.

What is claimed is:

1. The method of fabricating a signal translating device which comprises mounting a strip of gold upon a heater filament, seating a slab of N-type silicon upon said strip, mounting an aluminum wire in contact with said slab at a region thereof removed from said strip, and pulse heating said filament for heating the slab to a temperature above the aluminum-silicon eutectic and the gold-silicon eutectic and below the melting point of silicon, whereby the aluminum and gold are alloyed substantially simultaneously with the portions of said silicon slab contiguous therewith without melting of the bulk portion of the silicon slab.

2. The method of fabricating a signal translating device which comprises placing in contact with a body of N-type silicon, a connector composed of an alloy of gold and antimony, and heating said body at a temperature above 370° C. and below the melting point of silicon for a few seconds, thereby to form an alloy of silicon, gold and antimony at the region of contact between said body and the connector without melting of the bulk portion of the silicon body.

3. The method of manufacturing a silicon diode which comprises the steps of mounting a body of N-type silicon upon a heater filament, mounting an aluminum wire and a gold-antimony alloy wire in contact with spaced portions of said body, and passing a current through the heater filament for heating said body to a temperature above both the aluminum-silicon eutectic and the eutectic between silicon and the gold-antimony wire and below the melting point of silicon for bonding the two wires to said body.

4. A semiconductive diode comprising a body of silicon and bonded thereto at spaced intervals an aluminum wire connector for forming a rectifying connection to the body and a gold-antimony alloy connector for forming an ohmic connection to the body.

5. A silicon diode having asymmetric conducting properties comprising a silicon wafer whose gross portion is of N-type conductivity, an aluminum element bonded to the wafer and forming a rectifying connection with the gross portion of the wafer, and a gold-antimony alloy element bonded to the wafer and forming an ohmic connection to the gross portion of the wafer.

6. A silicon diode having asymmetric conducting properties comprising a silicon wafer whose gross portion is of N-type conductivity, an aluminum element bonded to the wafer for forming an aluminum-rich P-type region in the wafer which provides a rectifying connection to the gross portion of the wafer, and a gold-antimony alloy element bonded to the wafer for forming a gold-antimony rich region in the wafer which provides an ohmic connection to the gross portion of the wafer.

References Cited in the file of this patent

UNITED STATES PATENTS 1,130,077 Eldred ---------------- Mar. 2, 1915

(Other references on following page)

UNITED STATES PATENTS

| | | |
|---|---|---|
| 2,226,944 | Reeve | Dec. 31, 1940 |
| 2,329,483 | Queneau et al. | Sept. 14, 1943 |
| 2,398,449 | Ronci | Apr. 16, 1946 |
| 2,402,662 | Ohl | June 25, 1946 |
| 2,406,310 | Agule | Aug. 27, 1946 |
| 2,534,643 | Warner | Dec. 19, 1950 |
| 2,567,970 | Scaff et al. | Sept. 18, 1951 |
| 2,597,028 | Pfann | May 20, 1952 |
| 2,609,428 | Law | Sept. 2, 1952 |
| 2,627,010 | Matteson | Jan. 27, 1953 |
| 2,627,110 | Hickey | Feb. 3, 1953 |
| 2,646,536 | Benzer et al. | July 21, 1953 |
| 2,654,059 | Shockley | Sept. 29, 1953 |
| 2,685,728 | Ohl | Aug. 10, 1954 |

FOREIGN PATENTS

| | | |
|---|---|---|
| 625,195 | Great Britain | June 23, 1949 |